United States Patent [19]
Dunkl et al.

[11] 3,909,682
[45] Sept. 30, 1975

[54] CAPACITOR AND ELECTROLYTE

[75] Inventors: Franz S. Dunkl; Sidney D. Ross, both of Williamstown; Manuel Finkelstein, North Adams, all of Mass.

[73] Assignee: Sprague Electric Company, North Adams, Mass.

[22] Filed: Nov. 8, 1974

[21] Appl. No.: 522,361

[52] U.S. Cl. ............. 317/230; 252/62.2; 260/501.1
[51] Int. Cl.² ........................................ H01G 9/02
[58] Field of Search ................... 317/230; 252/62.2

*Primary Examiner*—John Kominski
*Attorney, Agent, or Firm*—Connolly and Hutz

[57] ABSTRACT

An aluminum electrolytic capacitor having dimethylammonium acid salts in the electrolyte solution.

4 Claims, 2 Drawing Figures

U.S. Patent    Sept. 30,1975    3,909,682

CAPACITOR AND ELECTROLYTE

BACKGROUND OF THE INVENTION

This invention concerns electrolytic capacitors which include electrodes contacted by a specific type of electrolyte, and more particularly to aluminum electrodes contacted by fully reacted acid salt electrolytes.

Electrolytes for capacitors having aluminum electrodes were for many years composed of aqueous solutions of acids. Another prior art electrolyte employed in aluminum electrolytic capacitors has involved the reaction of boric, salicylic or other acid with an amide such as dimethylformamide. This has provided a suitable working electrolyte for many aluminum electrolytic capacitors. However, this electrolyte is limited to low voltage use, because capacitors containing this electrolyte are not stable at high voltages when used over a period of time.

It is an object of the present invention to overcome the foregoing disadvantages in aluminum electrolytic capacitors by employing reacted acidic compounds with substituted amides suitable for use over broad temperature ranges for long periods of time without adverse or detrimental changes in electrical properties.

SUMMARY OF THE INVENTION

This invention provides the preparation of an inexpensive electrolyte containing dimethylammonium acid salt for aluminum electrolytic capacitors by the reaction of acidic compounds with the substituted amide to form the dimethylammonium acid salts.

This electrolyte is a reacted mixture of dimethylformamide or dimethylacetamide with an acid, such as salicylic acid, boric acid, and picric acid. The reaction mixture of the dimethylformamide and an acid selected from the particular group of this invention has a low resistivity and remains stable indefinitely. Accordingly, a capacitor containing this reaction mixture in the electrolyte system is relatively unchanged by aging of the unit during extended operation.

The present invention involves both the novel electrolyte system containing the reaction mixture and the methods of preparing this improved capacitor electrolyte.

The capacitor section may be housed in any conventional capacitor container.

Figure 1:
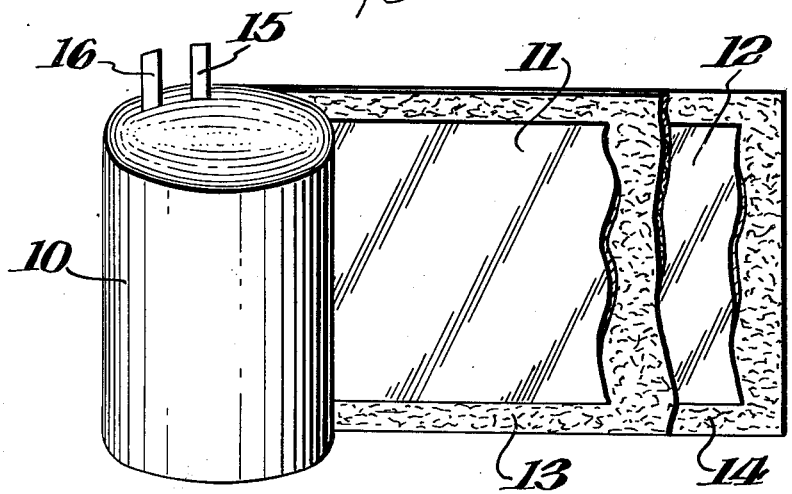
FIG. 1 illustrates a capacitor section 10 partially unwound having an anode 11 and a cathode 12. The anode 11 consists of an aluminum foil and cathode 12 consists of a metal foil. Porous spacers 13 and 14 are of a material inert to the electrochemical reactions and are impregnated with an electrolyte according to this invention. Tabs 15 and 16 provide means for connection to the anode 11 and cathode 12, respectively.
Figure 2:
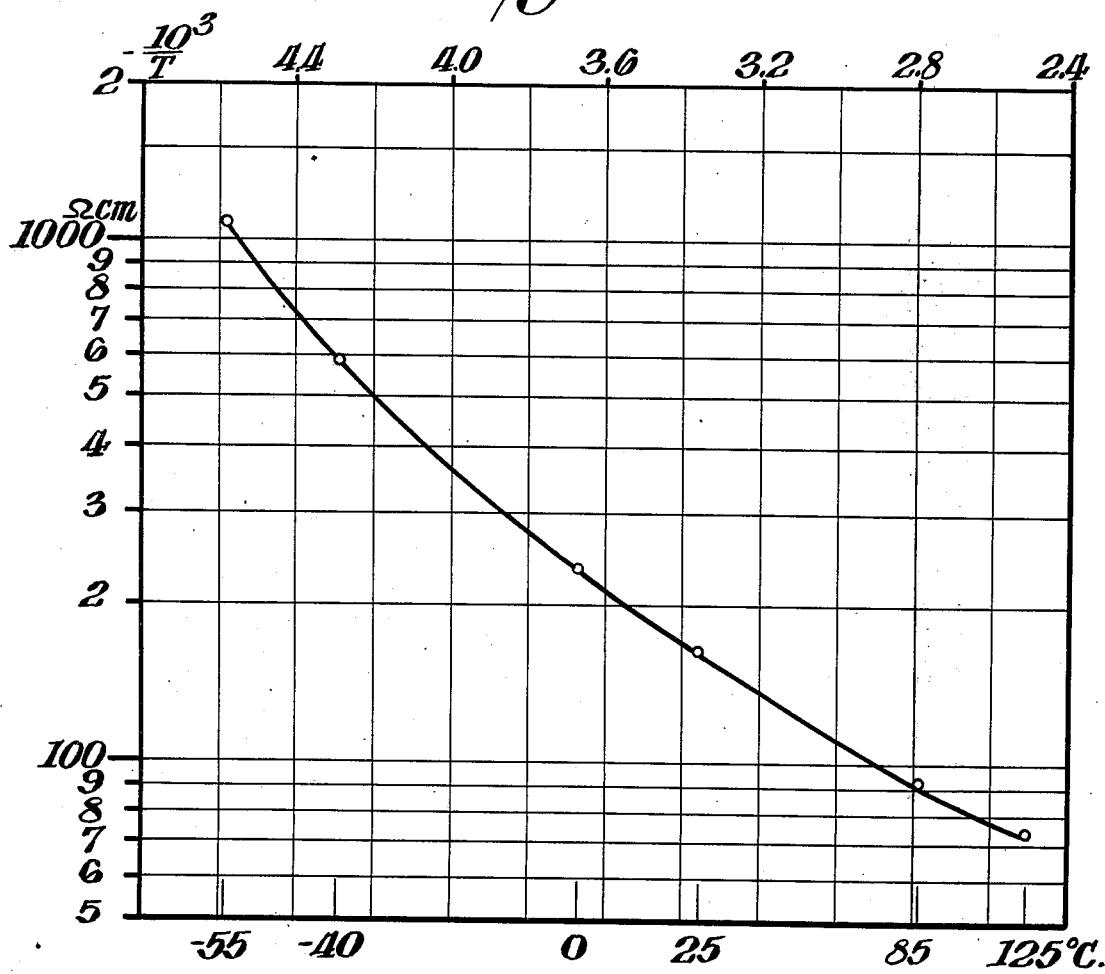

FIG. 2 is a graph of the curve showning the conductivity of a representative electrolyte according to this invention.

DESCRIPTION OF THE PREFERRED EMBODIMENTS

Boric, salicylic and other acids with dimethylformamide, hereinafter referred to as DMF, have proven to be useful in capacitor electrolyte systems. With the acid salts of this invention a high voltage rating stable capacitor is achieved with low resistivity. A group of acids reacted with a substituted amide provide an electrolyte having a resistivity of from about 100 to about 600 ohm-cm. The group of acids includes salicylic acid, boric acid, phosphotungstic acid, and combinations of boric acid with pyrocatechol or naphthalenediol.

An acid heated in DMF at 125°C is converted to the dimethylammonium salt in excellent yield. Thus when 0.05 mole of picric acid in 100 ml. DMF is heated 24 hours at 125–130°C an 84% yield of dimethylammonium picrate, m.p. 159–162°C, can be isolated. This reaction does not involve a prior hydrolysis of DMF to give formic acid and dimethylamine. No formic acid is formed, and if the effluent gasses from the reaction are passed into a solution containing phosphomolybdic acid and palladium chloride, the deep blue coloration indicating the presence of carbon monoxide is observed. The carbon monoxide has also been collected in a gas burette and identified by VPC.

The following examples are illustrative, not limitative of the present invention, showing the preparation of the reaction mixture. The equation with the structural formulae graphically represents the reaction course.

EXAMPLE 1

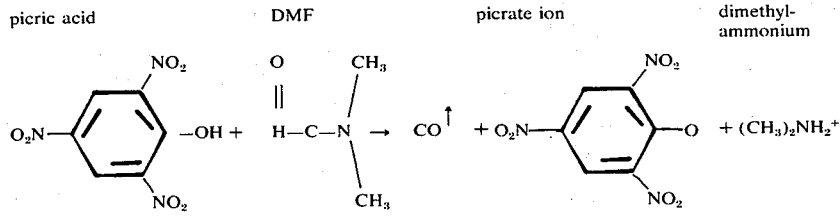

A solution of 0.1 mole of p-toluenesulphonic acid monohydrate in 200 ml. of DMF has a room temperature resistivity of 253 ohm-cm. and an apparent pH of 2.1. After 4 hours at 125°C the room temperature resistivity decreases to 137 ohm-cm and the apparent pH increases to 5.5. Removal of the DMF in vacuo and crystallization of the crude product from acetone-ether yielded 19 g. (87.6%) of dimethylammonium p-toluenesulphonate, m.p. 76°–79°.

EXAMPLE 2

The above reaction was observed with an acid as weak as boric acid. A solution of boric acid (30 g.; 0.485 mole) in DMF (300 ml.) has a room temperature resistivity of 11,000 ohm-cm and an apparent pH of 3.5. After heating at 125°C for 15 hours there is some precipitation, but the supernatant liquid has a room temperature resistivity of 1,038 ohm-cm and an apparent pH of 7.4. After cooling to complete the crystallization, 18 g. (70%) of dimethylammonium pentaborate was obtained.

Anal. Calcd. for $C_2H_{12}B_5NO_{10}$: N, 5.30%. Found: N, 5.74%.

EXAMPLE 3

The reaction was observed with a solution of salicylic acid (138 g.; 1 mole) and boric acid (30.9 g.; 0.5 mole) in DMF (750 ml.), heated overnight at 125°C, yielded, after removal of the DMF in vacuo and crystallization from acetone-methanol-ether, 124 g. (83.5%) of dimethylammonium borodisalicylate; m.p. 193°–195°.

EXAMPLE 4

Similar reactions were observed in dimethylacetamide. When dry picric acid (23 g.; 0.1 mole) in freshly distilled dimethylacetamide was heated 24 hours at 125°C, two products were isolated. These were dimethylammonium picrate, 11.6 g. (42.5%) and the 1:1 complex of picric acid and dimethylacetamide, 11.5 g. (36.3%). This complex, which melts at 62°–64°, has been reported previously (V.F. Chesnokov and I.M. Bokhovkin, J.Gen.Chem.,USSR, 39, 915 (1969). It was prepared independently in quantitative yield by dissolving picric acid in an equal weight of dimethylacetamide, cooling and adding ether.

Similar 1:1 complexes have also been prepared in this way: from picric acid and dimethylformamide (m.p. 45°–46°); from N-methylpropionamide and picric acid (m.p. 48°–49°; and, from dimethylacetamide and 2,4-dinitrophenol (m.p. 62°–64°).

EXAMPLE 5

When a solution of 1:1 dimethylacetamide-picric acid complex (5.0 g.) in n-butylalcohol (8 ml.) was refluxed 48 hours the products obtained were dimethylammonium picrate, m.p. 158°–161°, 3.4 g. 91.9%) and n-butylacetate, 1.16 g. (63.3%). In this case salt formation results in the formation of ketene, rather than carbon monoxide, and the reaction course is as shown below.

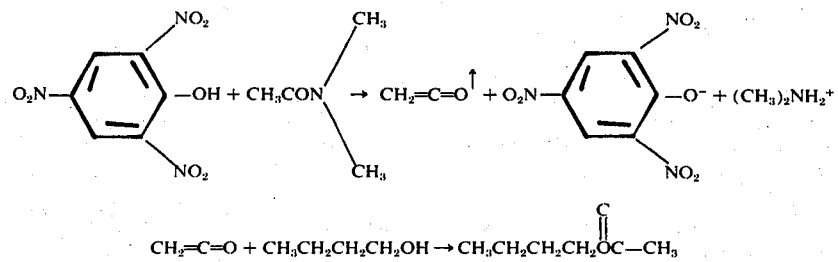

The reaction mixtures of this invention have been found to provide capacitor electrolytes which have a low loss of conductivity at low temperature, stability at prolonged exposure to high temperature, and low leakage current of the capacitors made with it.

The following examples describe electrolytes according to this invention containing solutions of dimethylammonium acid salts in DMF. The observed characteristics illustrate the advantages.

EXAMPLE 6

Phosphotungstic Acid 100 g. DMF has added to it 18 g. phosphotungstic acid and the mixture is reacted with heating to form a solution of dimethylammonium acid salt in DMF. The following observed results are illustrative:

|  | Ohm cm. 25°C | pH |
|---|---|---|
| before reacting | 206 | 1.7 |
| after 2 hrs. at 125°C | 158 | 7.0 |
| after 16 hrs. at 125°C | 156 | 7.0 |

| °C | −55 | −40 | 0 | 25 | 85 | 125 |
|---|---|---|---|---|---|---|
| Ohm cm. | 1090 | 592 | 234 | 163 | 91.5 | 74.0 |

FIG. 2 shows how the resistivity of the electrolyte of this invention varies with temperature.

Life test of 12 units, 40 V at 125°C, Averages:

|  | μF | RC | μA |
|---|---|---|---|
| 0 hr. | 315.7 | 49 | 3.0 |
| 500 hrs. | 311.6 | 69 | 2.2 |
| 1000 hrs. | 307.8 | 72 | 1.9 |
| 2000 hrs. | 307.7 | 75 | 1.29 |

EXAMPLE 7

Borodisalicylate 5.3 g. salicylic acid and 1.22 g. boric acid are mixed in 100 g. DMF and the mixture reacted with heating to form a solution of dimethylammonium acid salt in DMF. The following observed results are illustrative:

|  | Ohm cm. | pH |
|---|---|---|
| before reacting at 25°C | 238 | 1.9 |
| after 2 hrs. at 125°C | 146 | 6.3 |

Life test of 5 units, 40V at 125°C, Averages:

|  | μF | RC | μA |
|---|---|---|---|
| 0 hr. | 314.9 | 56 | 3.0 |
| 500 hrs. | 311.4 | 77 | 2.2 |
| 1000 hrs. | 302.6 | 97 | 1.63 |

EXAMPLE 8

Dimethylammonium borodisalicylate 6.58 g. of dimethylammonium borodisalicylate in a DMF solution at 25°C has a resistivity of 136 ohm cm and a pH of 9.1. The following is illustrative:

Life test of 11 units, 40V at 125°C, Averages:

|  | μF | RC | μA |
|---|---|---|---|
| 0 hr. | 315.9 | 71 | 1.9 |
| 500 hrs. | 308.9 | 67 | 1.7 |
| 1000 hrs. | 308.2 | 59 | 1.3 |

EXAMPLE 9

Borodisalicylate 5 g. of salicylic acid and 2.5 g. of boric acid are mixed in 100 ml. of DMF and the mixture reacted with heating to provide a product showing the following illustrative results.

|  | Ohm cm. | pH |
|---|---|---|
| before reacting at 25°C | 229 | 1.9 |
| after 2 hrs. at 125°C | 149 | 6.5 |
| after 16 hrs. at 125°C | 149 | 6.5 |

Formation of aluminum foil in this electrolyte shows the following:
Max. formation voltage at:

| 25°C | 168V |
|---|---|
| 125°C | 168V |

EXAMPLE 10

5 g. of salicylic acid and 2.5 g. boric acid are mixed in 100 ml. of dimethylacetamide and the mixture reacted with heating to provide a product showing the following illustrative results.

|  | Ohm cm. | pH |
|---|---|---|
| before reacting at 25°C | 267 | 3.1 |
| after 2 hrs. at 125°C | 211 | 3.9 |
| after 16 hrs. at 125°C | 186 | 5.1 |
| after 32 hrs. at 125°C | 181 | 9.1 |

Formation of aluminum foil in this electrolyte shows the following:

Max. formation voltage at:
| 25°C | 174V |
|---|---|
| 125°C | 135V |

EXAMPLE 11

Borodicatecholate 4.24 g. of pyrocatechol and 2.65 g. of boric acid were mixed in 100 g. of DMF and the mixture reacted with heating to provide a product with the following illustrative results.

|  | Ohm cm. | pH |
|---|---|---|
| before reacting at 25°C | 2240 | 2.9 |
| after 2 hrs. at 125°C | 261 | 4.7 |
| after 16 hrs. at 125°C | 167 | 6.7 |
| after 34 hrs. at 125°C | 164 | 6.7 |

Formation of aluminum foil in this electrolyte shows the following:

Max. formation voltage at:
| 25°C | 152V |
|---|---|
| 125°C | 180V |

EXAMPLE 12

An electrolyte according to this invention was prepared with mixing pyrocatechol in DMF and heating wherein the following formulation was first prepared:

| DMF | 79 g. |
|---|---|
| Glycol | 5 g. |
| Boric Acid | 10 g. |
| Catechol | 0.26 g. (0.00238 moles) |
| Tri-Butylamine | 5.5 g. (0.0298 moles) |

It was determined that, as initially prepared, this electrolyte had a resistivity of 603 ohms-cm. at 25°C and had the following voltage capabilities:

| V max. 25°C Al foil preboiled: | 440 |
|---|---|
| untreated foil: | 406 |
| V max. 125°C boiled foil: | 455 |
| untreated foil: | 450 |

After heating 16 hrs. at 125°C, the resistivity decreased to 474 ohms-cm. at 25°C. The voltage capabilities are as follows:

| V max. 25°C Al foil preboiled: | 485 |
|---|---|
| untreated foil: | 415 |
| V max. 125°C boiled foil: | 455 |
| untreated foil: | 455 |

EXAMPLE 13

Boro-di-naphthalenediolate 12.66 g. boric acid and 0.8 g. 2,3-naphthalenediol are mixed in 100 g. DMF and the mixture heated overnight at 125°C. 6.33 g. glycol is added to form a solution of dimethylammonium pentaborate and dimethylammonium boro-di-naphthalenediolate in DMF glycol system. The following results are illustrative:

Resistivity after 1,000 hours at 125°C = 650 ohm cm.

Life test of 7 units, 200V at 125°C, Averages:
|  | μF | RC | μA |
|---|---|---|---|
| 0 hr. | 28.92 | 39 | 7.6 |
| 1000 hrs. | 28.88 | 40 | 5.6 |

The heating process provided a conversion to salts. It is an advantage that the heating does not impair the ability of the electrolyte to form untreated foil at 25°C but rather improves it slightly.

It has also been found that the salts formed according to this invention may be prepared independently of the other electrolyte components, such as glycol. The following example demonstrates the preparation not in an electrolyte system.

EXAMPLE 14

4 g. of dimethylammonium pentaborate were prepared by heating boric acid in DMF for 16 hours and isolating the salt. 0.33 g. of dimethylammonium boro-di-catecholate were prepared by heating a mixture of boric acid and catechol in DMF overnight and isolating the salt.

An electrolyte system was formulated as follows:

| | |
|---|---|
| DMF | 79 g. |
| Glycol | 5 g. |
| Dimethylammonium pentaborate | 4 g. |
| Dimethylammonium boro-di-catecholate | 0.33 g. |

The resultant electrolyte was unaffected by heating at 125°C and no new salts were formed. The resistivity both before and after heating was 525 ohms-cm. The formation capabilities were unchanged on heating. Both before and after heating 16 hours at 125°C the results were as follows:

EXAMPLE 15

Formation of aluminum foil in the electrolyte of Example 14 shows the following:

| | |
|---|---|
| V max. 25°C Al foil preboiled: | 485 |
| untreated foil: | 465 |
| V max. 125°C boiled foil: | 472 |
| untreated foil: | 468 |

Further it was determined that these electrolyte properties are not significantly altered by the initial addition of 3 g. of water to the formulation.

The electrolyte systems achieved by this invention provide electrical stability against change over extended periods of service. The electrolyte salts produced by the method of this invention provide a predictable stability because they do not undergo any further chemical transformation during use in an electrolyte system within the electrolytic capacitor. Further, this invention provides a capacitor electrolyte containing an acid and a substituted amide which maintains a high voltage rating over a period of service. Specifically the novel electrolyte system exhibits no significant change in resistivity over a period of time.

As evidenced by the foregoing data, the formulations presented here result in capacitors having improved qualities and properties over previously known devices, particularly in the stability of high voltage ratings.

What is claimed is:

1. An electrical capacitor comprising a capacitor housing; a capacitance section within the housing, said section having at least a pair of spaced electrodes one of which is coated with a dielectric film; and an electrolyte in contact with said electrodes; said electrolyte consisting essentially of a solvent and a solute prepared from a liquid mixture of a substituted amide and an acid selected from the group consisting of (1) phosphotungstic acid, (2) a combination of salicylic acid and boric acid, (3) a combination of pyrocatechol and boric acid, and (4) a combination of 2,3-naphthalenediol and boric acid, said mixture being reacted at about 125°C for at least 2 hours and said electrolyte having a low resistivity.

2. A capacitor as claimed in claim 1 having a resistivity of from about 100 to 600 ohm-cm. at 125°C.

3. A capacitor as claimed in claim 1 wherein the substituted amide is dimethylformamide.

4. A capacitor as claimed in claim 1 wherein the substituted amide is dimethylacetamide.

* * * * *

UNITED STATES PATENT OFFICE
CERTIFICATE OF CORRECTION

PATENT NO. : 3,909,682
DATED : September 30, 1975
INVENTOR(S) : Franz S. Dunkl et al It is certified that error appears in the above-identified patent and that said Letters Patent are hereby corrected as shown below:

Column 1, line 68, correct the spelling of -- showing --
Column 2, line 37, the reaction should read

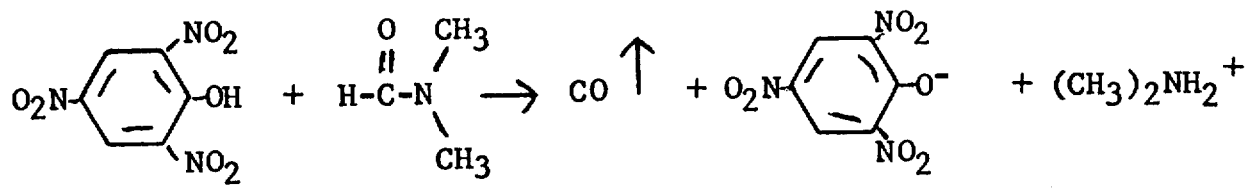

Column 3, line 38, "91.9%)" should read -- (91.9%) --

Signed and Sealed this second Day of March 1976

[SEAL]

Attest:

RUTH C. MASON
Attesting Officer

C. MARSHALL DANN
Commissioner of Patents and Trademarks